(12) United States Patent
Kimura

(10) Patent No.: US 8,047,826 B2
(45) Date of Patent: Nov. 1, 2011

(54) MOLD FIXING SYSTEM

(75) Inventor: Seiji Kimura, Hyogo (JP)

(73) Assignee: Pascal Engineering Corporation, Hyogo (JP)

( * ) Notice: Subject to any disclaimer, the term of this patent is extended or adjusted under 35 U.S.C. 154(b) by 185 days.

(21) Appl. No.: 12/449,234

(22) PCT Filed: Jun. 26, 2007

(86) PCT No.: PCT/JP2007/000692

§ 371 (c)(1), (2), (4) Date: Jul. 29, 2009

(87) PCT Pub. No.: WO2008/105033

PCT Pub. Date: Sep. 4, 2008

(65) Prior Publication Data

US 2010/0092587 A1 Apr. 15, 2010

(30) Foreign Application Priority Data

Feb. 23, 2007 (JP) .................... PCT/JP2007/053406

(51) Int. Cl.
*B29C 33/32* (2006.01)
*B29C 45/76* (2006.01)

(52) U.S. Cl. ............ 425/3; 425/135; 425/138; 425/161; 425/162; 425/190

(58) Field of Classification Search .............. 425/3, 135, 425/138, 161, 162, 183, 190, 192 R
See application file for complete search history.

(56) References Cited

U.S. PATENT DOCUMENTS 7,871,255 B2 * 1/2011 Kimura .............................. 425/3

FOREIGN PATENT DOCUMENTS

| JP | 4-135806 | * | 5/1992 |
| JP | 9-174559 | | 7/1997 |
| JP | 2005-169840 | | 6/2005 |

* cited by examiner

*Primary Examiner* — James Mackey
(74) *Attorney, Agent, or Firm* — Jordan and Hamburg LLP

(57) ABSTRACT

Each of a plurality of injection molding machines is provided with clamp plates fixed on platens and a plurality of magnet units to generate magnetic force for fixing a mold to the clamp plate fitted on the clamp plates; and the plurality of injection molding machines are provided with a plurality of common connectors having the same structure, each of which is electrically connected to the magnetic unit, a molding machine control unit and a power source device; and the mold fixing system comprises a set of operation control units to be shared by the plurality of injection molding machines, and when a mold is to be exchanged in any of the injection molding machines, the plurality of magnet units are switched to the non-adsorbing state or the adsorbing state via the operation control unit in the state where the operation control unit is connected to the common connector of the injection molding machine.

9 Claims, 13 Drawing Sheets

MOLD FIXING SYSTEM

TECHNICAL FIELD

The present invention relates to a mold fixing system for a plurality of injection molding machines having a pair of platens, respectively, and particularly relates to a mold fixing system where a set of operation control units can be shared by the plurality of injection molding machines.

BACKGROUND TECHNOLOGY

Conventionally, in the injection molding machine, molds (stationary mold and movable mold) are secured to platens, such as a stationary platen or a movable platen, and the movable platen is moved and driven so as to approach or isolate to/from the stationary platen, and the molds are closed or opened. While the molds are clamped, a synthetic resin in the molten state is injected into an internal cavity of these molds and a molded article is molded, and then, the molds are opened and the molded article is ejected by an ejector mechanism.

Herein, fixation of the molds to the platens of the injection molding machine is often conducted using a plurality of bolts or a hydraulic clamp device, and recently, a magnetic fixation device to adsorb the molds to the platens due to magnetic force and fix them is practically used.

In the injection molding machine of Patent Literature 1, it is configured such that a clamp plate where a plurality of magnet units (magnetic force generating mechanisms) are incorporated, respectively, is fixed to the stationary platen and the movable platen, respectively, and the molds are fixed to the fixation surface of the clamp plates by the magnetic force generated by the plurality of magnet units. Each of the magnet units has a steel block, a plurality of permanent magnets arranged around the outer circumference of this steel block, an alnico magnet placed on the rear side of the steel block and a coil surrounding the outer circumference of this alnico magnet, and energizing of the coil enables to switch the direction (polarity) of the magnetic field of the alnico magnet.

When the molds are fixed to the fixation surface of the clamp plates, electric power is supplied from the control unit to each magnet unit and the coils are energized for several seconds in the predetermined direction by operating a control panel, respectively, and the alnico magnet and the plurality of permanent magnets form a magnetic circuit where molds become a portion of magnetic path, and the plurality of magnet units are switched to an adsorbing state for adsorbing the molds.

In the meantime, in the case of releasing the fixation of the molds, the coils are energized for several seconds in a direction, which is opposite to that of the case of adsorbing the molds, and the polarity of the alnico magnet is switched to the opposite state, and a magnetic circuit where the molds are not in a portion of the magnetic path is formed and the plurality of magnet units are switched to the non-adsorbing state not for adsorbing the molds.

Patent Document 1: Japanese Laid-Open Patent Publication No. 2005-169840

DISCLOSURE OF THE INVENTION

Problems to be Solved by the Invention

In each injection molding machine, for the purpose of operating and controlling a plurality of the magnet units mounted on a pair of clamp plates at the stationary side and the movable side, a control panel and a control unit for mold attachment/detachment are established, respectively. These control panel and control unit are used only when power is supplied to each magnet unit of the injection molding machines for several seconds in the case of exchanging the molds, and they are not used on any other occasions. Consequently, if the control panel and the control unit for mold attachment/detachment are placed in each injection mold machine, the plant cost for mold fixation becomes high and the plant cost at a molding plant having a plurality of injection molding machines becomes high.

The purpose of the present invention is to provide a mold fixing system which has a plurality of magnetic force generating mechanisms mounted on a plurality of injection molding machines for mold fixation, respectively, and which enables to share a set of a control panel and a control unit among the plurality of injection molding machines.

Means to Solve the Problem

The present invention relates to a mold fixing system relating for a plurality of injection molding machines having a pair of platens, respectively, comprising:

a plurality of magnetic force generating mechanisms which are mounted on the plurality of injection molding machines, respectively, for generating magnetic force for fixing a mold to a platen or a mold mounting plate fixed on the platen;

a plurality of common connectors having the same structure which are mounted on the plurality of injection molding machines, respectively, each of which is electrically connected to the magnetic force generating mechanism, a control unit and a power source device of the injection molding machine; and a set of operation control units to be alternatively electrically connectable to any one of the plurality of injection molding machines, and which is electrically connectable to the magnetic force generating mechanism, the control unit and the power source device in any one of the injection molding machines.

Advantages of the Invention

According to the mold fixing system of the present invention, because it is configured such that a common connector is provided on each of the plurality of injection molding machines and a set of operation control units can be connected to the common connector in any one of the injection molding machines for exchanging the molds and are connectable electrically to the magnetic force generating mechanism and a control unit of the injection molding machine and a power source device, a set of the operation control units can be shared among a plurality of injection molding machines. Consequently, it becomes unnecessary to install a control panel and a control unit for mold attachment/detachment in each injection molding machine, and the plant cost can be reduced at a molding plant having a plurality of the injection molding machines.

In addition to above configuration of the present invention, the following various configurations may be adopted:

(1) A plurality of interlock boards, which are mounted on the plurality of injection molding machines, respectively, each of which is electrically connected to the magnetic force generating mechanism, the control unit, the power source device, and the common connector, respectively, are provided.

(2) The operation control unit comprises an operating part that can enter an instruction to the magnetic force generating mechanism, and a controller that supplies power to allow the magnetic force generating mechanism to be in a condition based upon the instruction from the operating part.

(3) The operation control unit supplies power to the magnetic force generating mechanism on condition that a signal indicating to be operable to the magnetic force generating mechanism is received from the interlock board.

(4) The magnetic force generating mechanism is configured to be switchable between an adsorbing state for adsorbing the mold and a non-adsorbing state not for adsorbing the mold, and an operating condition displaying mechanism which is capable of displaying an index indicating whether the magnetic force generating mechanism incorporated into the platen or the mold mounting plate is in the adsorbing state or the non-adsorbing state is provided on the platen or the mold mounting plate.

(5) A deviation detecting means for detecting a deviation or float of the mold fixed on the platen or the mold mounting plate, and a deviation detection controller for outputting an emergency stop signal to the control unit of the injection molding machine when the deviation or float of the mold is detected by the deviation detecting means, which is mounted on the interlock board are provided.

(6) The deviation detecting means is constituted with a proximity switch.

(7) The deviation detecting means is configured to detect the deviation or float of the mold from an induced current that is generated in the coil of the magnetic force generating means.

DESCRIPTION OF NUMERALS

Figure 1:
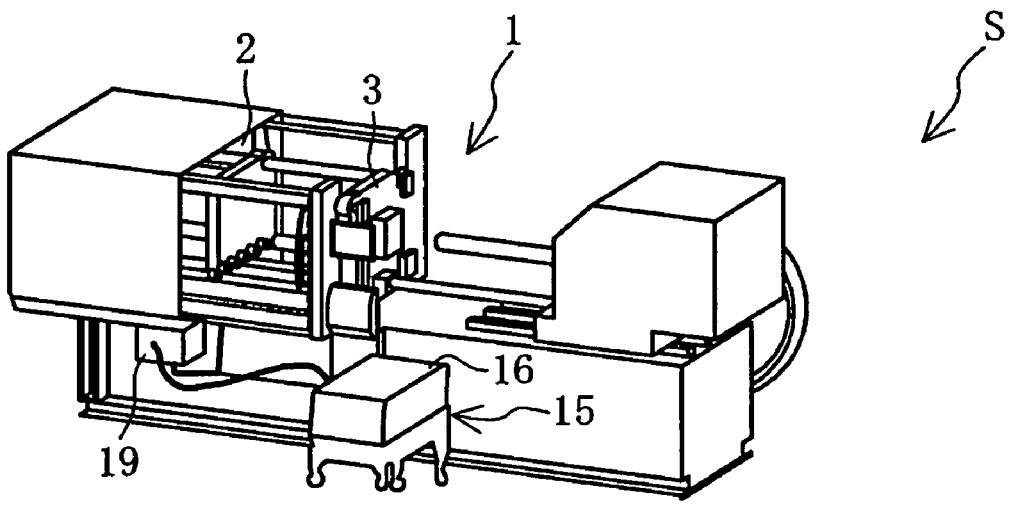
FIG. 1 is a perspective view of the mold fixing system in Embodiment 1.
Figure 1:
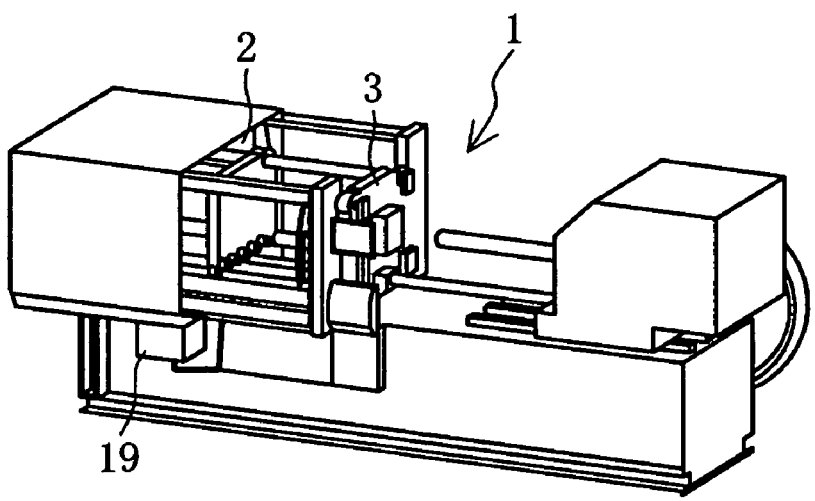
Figure 1:
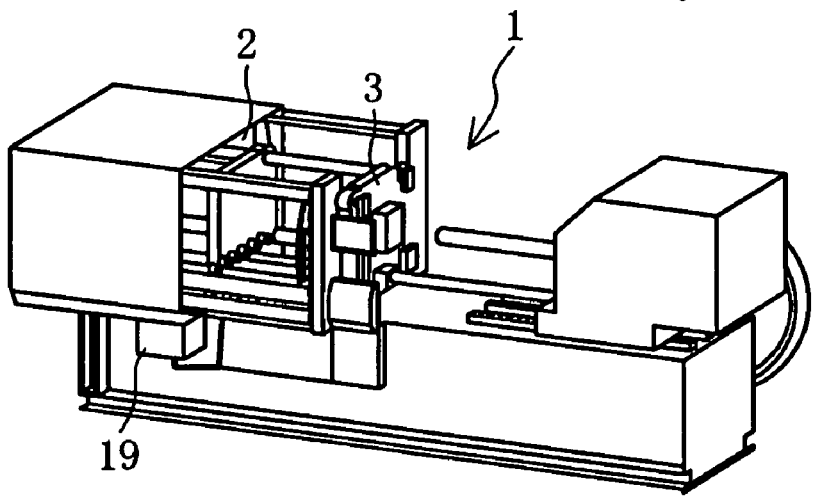

S mold fixing system
1 injection molding machine
2 stationary platen
3 movable plan
11, 12 clamp plate
13 magnet unit
15 operation control unit
16 operating board
17 controller
18b female connector (common connector)
19 interlock board
30 operating condition displaying mechanism
36 proximity switch

BEST MODE FOR IMPLEMENTING THE INVENTION

Hereafter, the best mode for implementing the present invention is explained based upon drawings.

Embodiment 1

Figure 2:
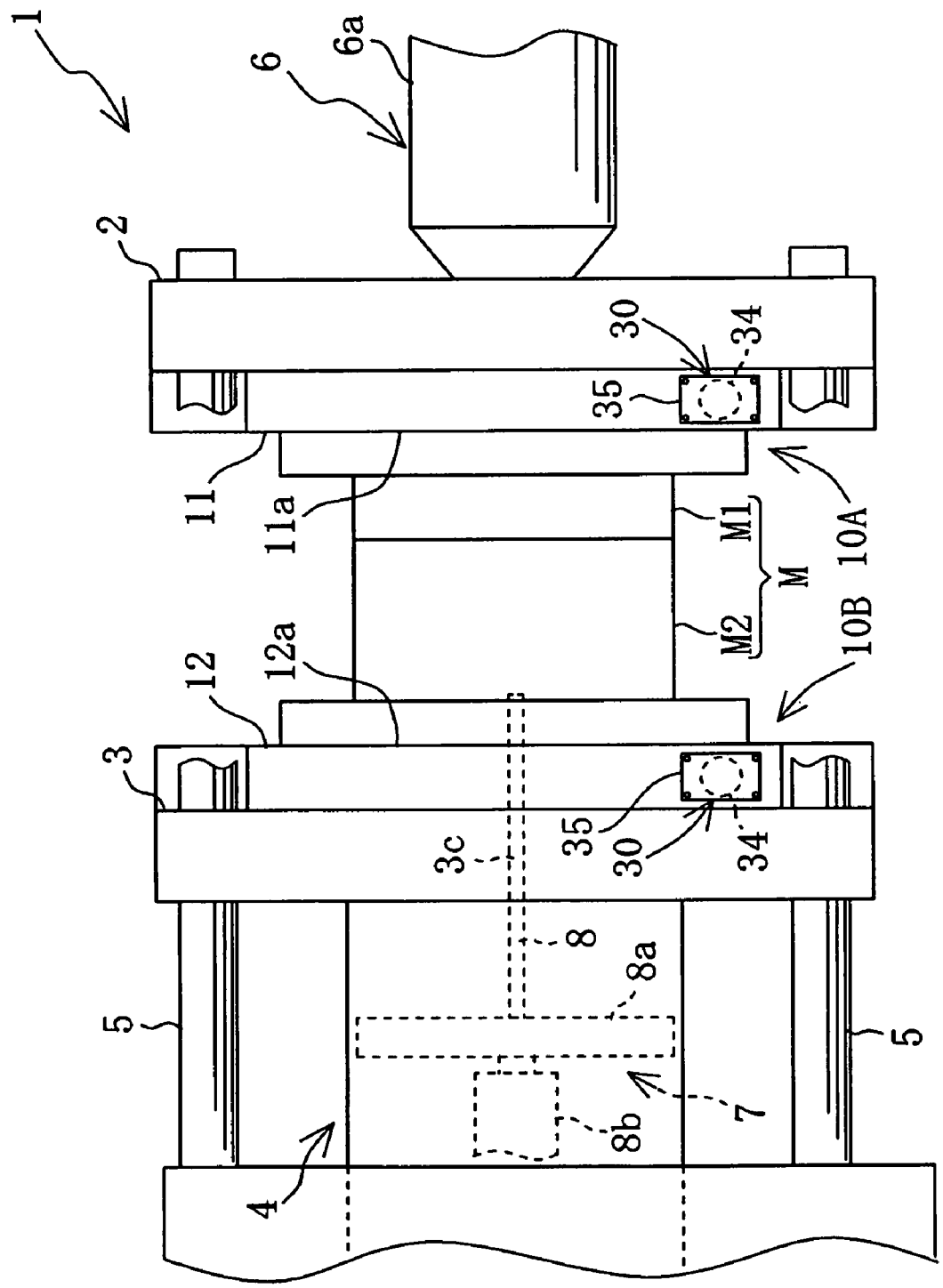
FIG. 2 is a front view of primary portion of the injection molding machine and a mold.

As shown in FIG. 1 and FIG. 2, the mold fixing system S is applied at a molding plant having a plurality of injection molding machines 1, and this mold fixing system S has a plurality of magnet units 13 (see FIG. 3 and FIG. 4) installed on a plurality of clamp plates 11 and 12 (mold mounting plates) equipped on surfaces of stationary platens 2 and movable platens 3, respectively; a plurality of interlock boards 19 equipped to the plurality of injection molding machines 1; a plurality of common connectors 18b (see FIG. 11) having the same structure equipped in the plurality of injection molding machines, respectively; an operating displaying mechanisms 30 where an index indicating whether the plurality of magnet units 13 to be described later are in the adsorbing state or non-adsorbing state are displayable; a proximity switch 36 (see FIG. 3 and FIG. 4) as deviation detecting means for detecting that the molds M fixed to the clamp plates 11 and 12 are deviated or floated; and a set of portable operation control unit 15 alternatively connectable to any one the plurality of injection molding machines 1.

First, the injection molding machine 1 is explained.

Figure 11:
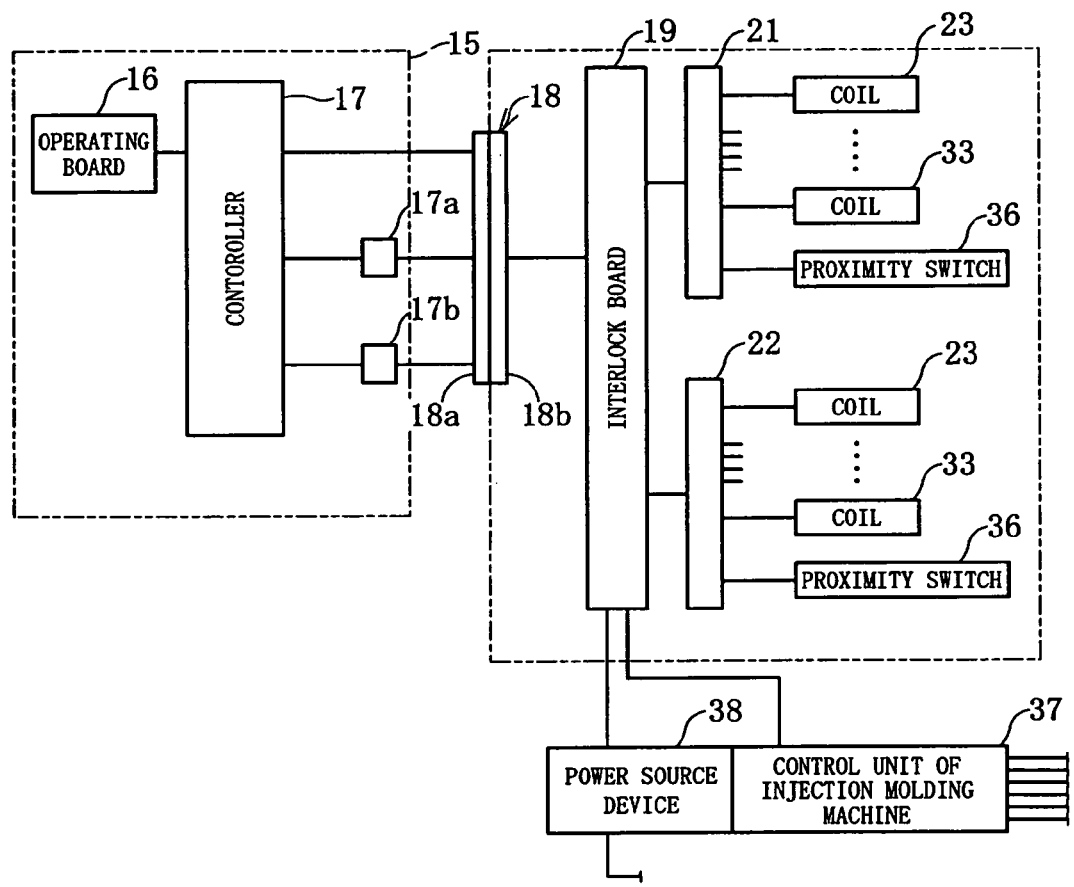
FIG. 11 is a block diagram of the injection molding machine and the control system of the operation control unit.

As shown in FIG. 2, the injection molding machine 1 is equipped with a pair of platens 2 and 3 facing each other for fixing the mold M (including a stationary mold M1 and a movable mold M2) as an object for clamping; a movable platen driving mechanism 4 having a hydraulic cylinder (or driving motor) for driving the movable platen 3 to approach/isolate to/from the stationary platen 2 for closing or opening molds; four guide rods 5 for guiding the platen 3 in the approaching/isolating directions; an injection mechanism 6 having an injection cylinder 6a for supplying a melted synthetic resin to the cavity within the mold M in the mold clamped state; an ejection mechanism 7 for ejecting a molded article from the movable mold M2; a molding machine control unit 37 for controlling various mechanisms regarding injection molding including the movable platen driving mechanism 4, the injection mechanism 6 and the ejection mechanism 7; and a power source device 38 (see FIG. 11).

When the injection molding is performed by the injection molding machine 1, the movable platen 3 is driven toward the stationary platen 2 by the movable platen driving mechanism 4, and the movable mold M2 is pressed to the stationary mold M1. When the injection molding machine 1 is in the mold closed state, the melted synthetic resin is injected into the mold M from the tip of the injection cylinder 6a and a molded article is molded. Then, the platen 3 is driven to the direction to be isolated from the platen 2 by the movable platen driving mechanism 4, and the injection molding machine 1 becomes the mold opened state where the movable mold M2 is isolated from the stationary mold M1. In this state, the molded article is ejected from the movable mold M2 by the ejection mechanism 7.

The ejection mechanism 7 is equipped with an ejector pin 8, an ejector plate 8a where a proximate end of this ejector pin 8 is connected, and a hydraulic cylinder 8b for driving the ejector pin 8 back and forth via this ejector plate 8a, and the ejector pin 8 is inserted to an ejector pin hole 3c formed in the center of the platen 3.

Various sensors are fitted in the various mechanisms relating to the injection molding including the movable platen driving mechanism 4, the injection mechanism 6 and the ejection mechanism 7, respectively, and signals from these plurality of sensors are sent to a molding machine control unit 37, respectively.

Figure 3:
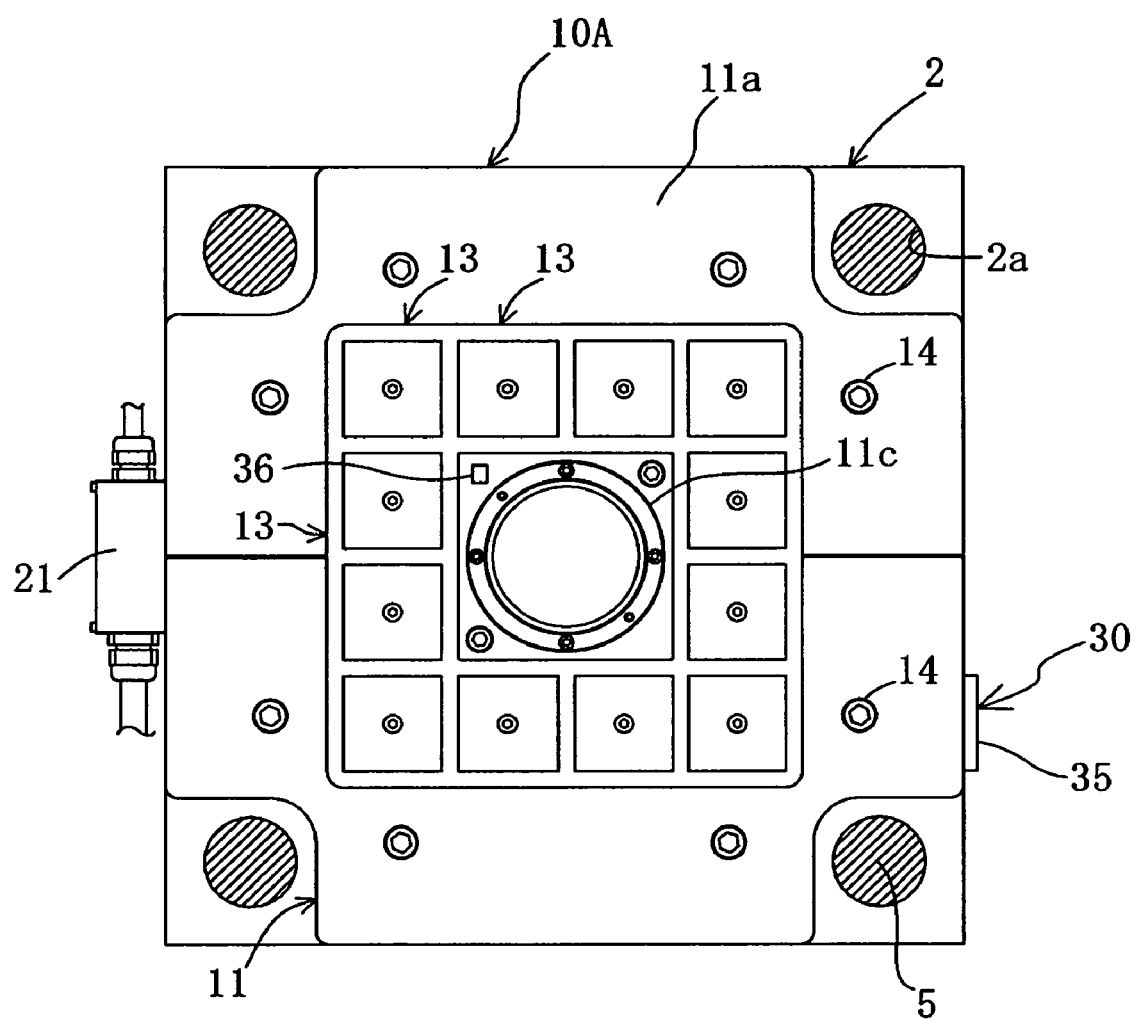
FIG. 3 is a side view of a stationary platen and a clamp plate.
Figure 4:
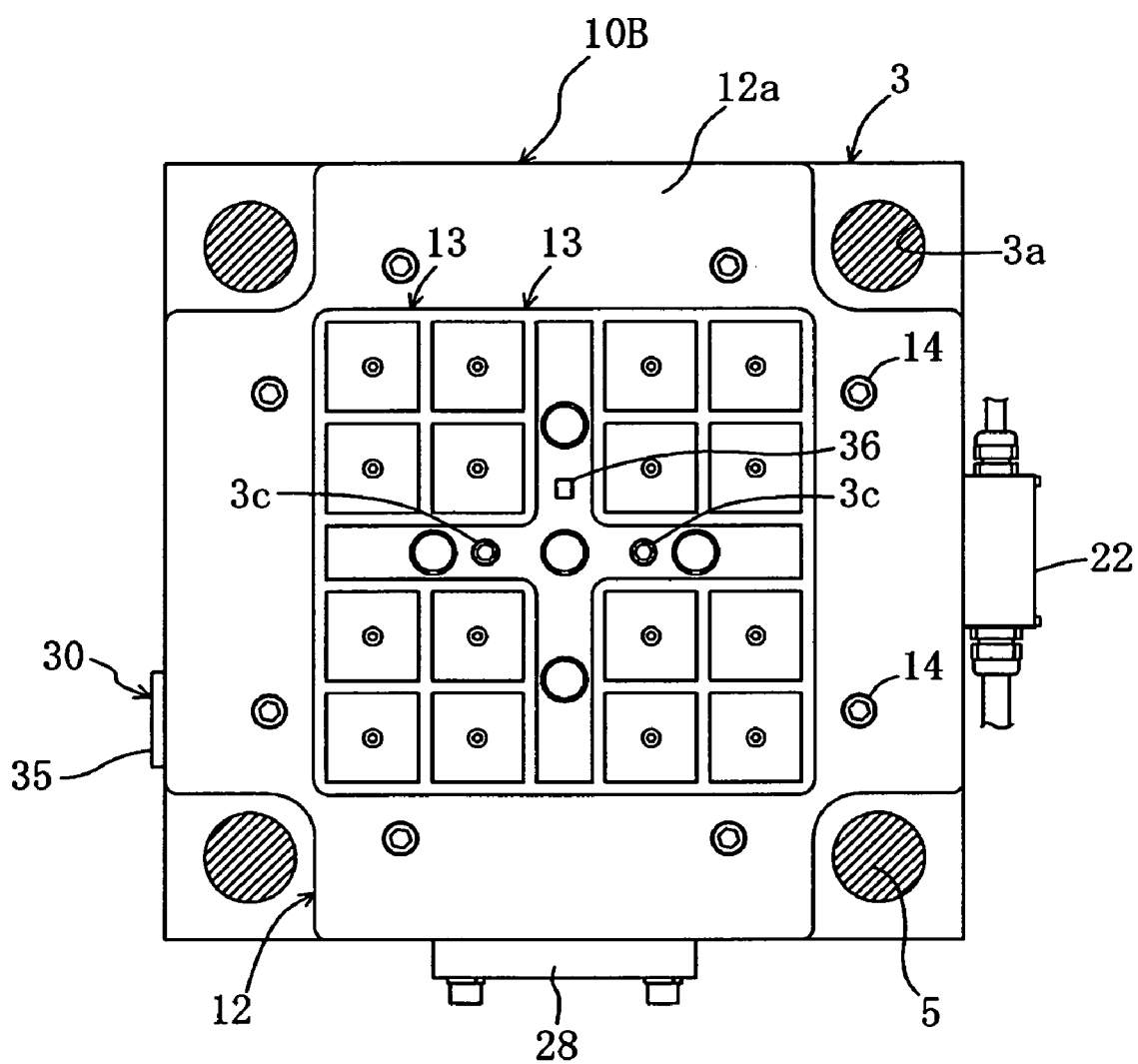
FIG. 4 is a side view of a movable platen and a clamp plate.

As shown in FIG. 3 and FIG. 4, the platens 2 and 3 are formed to be square-shaped, respectively; the four guide rods 5 are fixed to insertion holes 2a in the vicinity of the four corners of the platen 2, respectively; the four guide rods 5 are inserted into the insertion holes 3a slidably in the vicinity of the four corners of the platen 3; and the platen 3 is guided to be approachable/isolatable to the platen 2.

Next, explanation will be made on a magnetic force type fixation device 10A for fixing the stationary mold M1 to the platen 2 and a magnetic force type fixation device 10B for fixing the movable mold M2 to the platen 3.

As shown in FIGS. 2 to 4, the magnetic force type fixation device 10A is comprising a clamp plate 11 having a fixation surface 11a for fixing the mold M1 to the platen 2; a plurality of magnet units 13 (the magnetic force generating mechanisms), which are fitted in the clamp plate 11 and generate magnetic force for fixing the mold M1 to the fixation surface 11a; and the operating condition displaying mechanism 30 where an index indicating whether the plurality of magnet units 13 fitted on the clamp plate 11 are in the adsorbing state or not-adsorbing state is displayable.

The magnetic force type fixation device 10B comprises a clamp plate 12 equipped with a fixation surface 12a for fixing the mold M2 to the platen 3; a plurality of magnet units 13 (the magnetic force generating mechanisms), which are fitted in the clamp plate 12 and generate magnetic force for fixing the mold M2 to the fixation surface 12a; and the operating condition displaying mechanism 30 where an index indicating whether the plurality of magnet units 13 placed on the clamp plate 12 are in the adsorbing state or not-adsorbing state is displayable.

Next, the clamp plate 11 mounted on the surface of the platen 2 of the injection molding machine 1 will be explained. As shown in FIG. 2 and FIG. 3, the clamp plate 11 is a steel plate made from a magnetic material which has the same size as the platen 2, and substantially square portions corresponding to the four corners of the platen 2 are removed. The clamp plate 11 is fixed to the surface of the platen 2 by a plurality of bolts 14. The plurality of magnet units 13 to generate magnetic force for fixing the mold M1 to the fixation surface 11a are fitted in the clamp plate 11.

In the clamp plate 11, a pair of connectors 21 are mounted to the rear end, and a locating ring 11c is mounted in the center. The locating ring 11c is for fitting a locating ring of the mold M1 and for positioning the mold M1 to the fixation surface 11a. The operating condition displaying mechanism 30 is placed at the front end of the clamp plate 11.

Next, the clamp plate 12 mounted on the surface of the platen 3 of the injection molding machine 1 will be explained. As shown in FIG. 2 and FIG. 4, the clamp plate 12 is a steel plate made from a magnetic material which has the same size as the platen 3, and substantially square portions corresponding to the four corners of the platen 3 are removed. The clamp plate 12 is fixed to the surface of the platen 3 by a plurality of bolts 14. The plurality of magnet units 13 to generate magnetic force for fixing the mold M2 to the fixation surface 12a are fitted in the clamp plate 12.

In the clamp plate 12, a pair of connectors 22 are mounted to the rear end, and a safety catching block 28 for preventing the mold M2 from falling is mounted at the lower end, and a pair of ejector pin holes 3c are provided in the center. Furthermore, a hanging piece (illustration omitted) is mounted at the upper ends of the mold M1 and the mold M2, respectively, and a wire of a carrying means, such as a crane, is connected to the hanging piece, and the molds M1 and M2 are carried. The operating condition displaying mechanism 30 is placed at the front end of the clamp plate 12.

Next, the magnet unit 13 is explained in detail.

As shown in FIG. 3, three magnet units 13 in the corner portion are arranged in the adjacent state vertically and horizontally and they are regarded as one set of magnet unit group, and four sets of magnet unit groups, a total of twelve magnet units 13, are arranged in the point-symmetric position based upon the center of the clamp plate 11, on the clamp plate 11 of the platen 2. The proximity switch 36 as a shift detecting means is fitted in the center of the fixation surface 11a of the clamp plate 11.

As shown in FIG. 4, four magnet units 13 in the corner portion are arranged in the adjacent state vertically and horizontally and they are regarded as one set of the first magnet unit group, and four sets of magnet unit groups, a total of sixteen magnet units 13, are arranged in the point-symmetric position based upon the center of the clamp plate 11, on the clamp plate 11 of the platen 2. The proximity switch 36 as a shift detecting means is established in the center of the fixation surface 12a of the clamp plate 12.

Furthermore, the arrangement of the plurality of magnet units 13 is appropriately modifiable based upon the shape and size of the clamp plate 11 and shape and size of the mold M to be secured.

Next, the magnet units 13 fitted in the clamp plate 12 are explained as an example.

Figure 5:
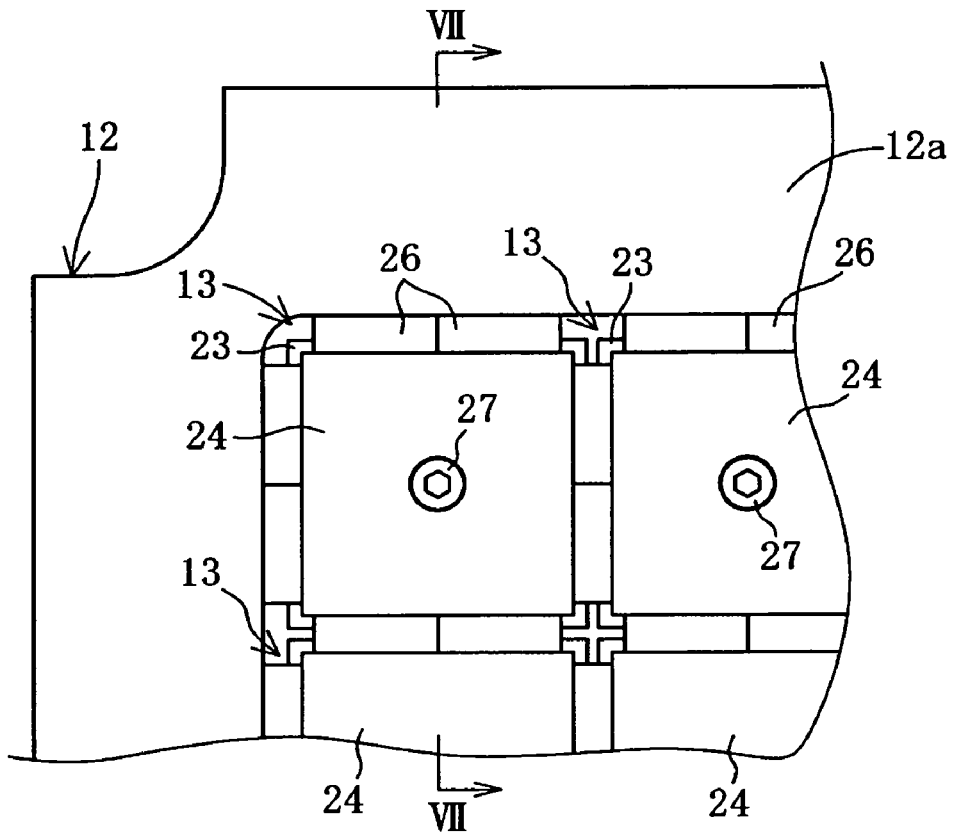
FIG. 5 is a side view showing primary portion of the magnet unit.
Figure 6:
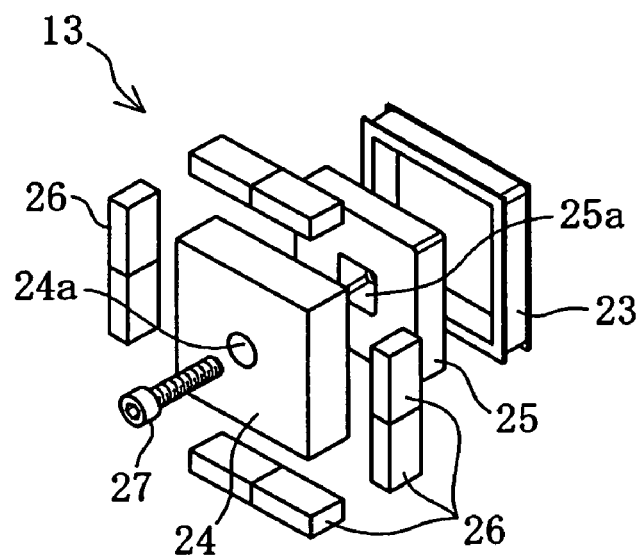
FIG. 6 is an exploded perspective view of the magnet unit.
Figure 7:
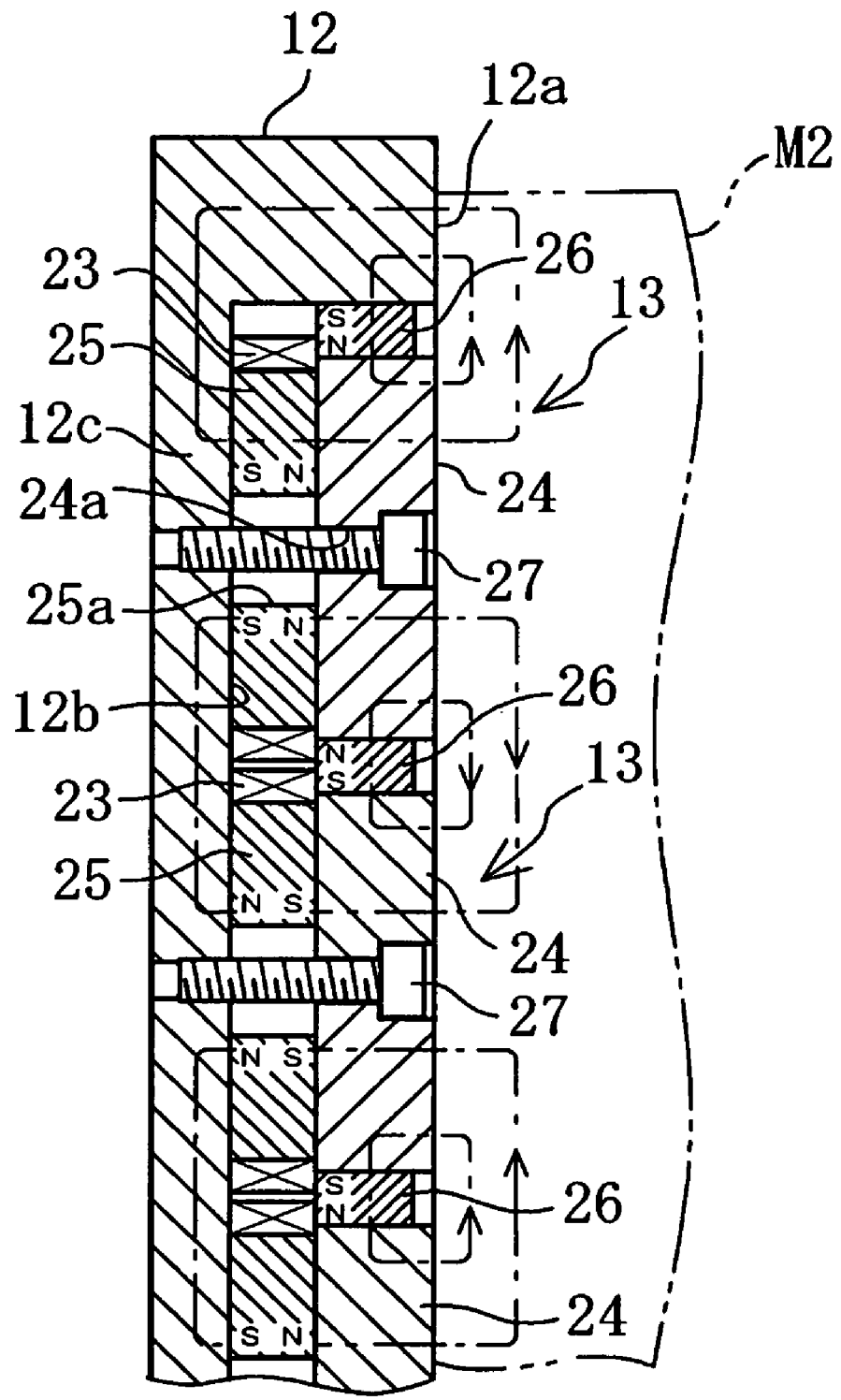
FIG. 7 is a cross sectional view of the clamp plate in the movable platen (adsorbing state)

As shown in FIGS. 5 to 7, each magnet unit 13 has a steel block 24 (a magnetic member) made from magnetic material facing the fixation surface 12a, a first alnico magnet 25 arranged on its rear surface side, a first coil 23 wound around the first alnico magnet 25 for switching the polarity of the first alnico magnet 25, and a plurality of (for example, eight) permanent magnets 26 made from a neodymium magnet arranged around the outer circumference of the steel block 24. The magnet units 13 are configured to be switchable between the adsorbing state for adsorbing the mold M2 and the non-adsorbing state not for adsorbing the mold M2. Furthermore, the permanent magnets 26 between the adjacent magnet units 13 are shared as the permanent magnet 26 of these magnet units 13.

The steel block 24 and the first alnico magnet 25 are formed to be square-shaped, and a bolt hole 24a is formed in the steel block 24 and a hole 25a is formed in the first alnico magnet 25. In the state where the first alnico magnet 25 and the first coil 23 arranged in the concave portion 12b are interposed between the steel block 24 and the bottom wall 12c of the clamp plate 12, these are clenched to the clamp plate 12 by a hexagon socket head bolt 27 made from non-magnetic material (for example, SUS304) inserted into the bolt hole 24a and the hole 25a. The plurality of permanent magnets 26 are firmly fixed to the steel block 24 and the clamp plate 12 by some sort of fixing means.

As shown in FIG. 7, in the adjacent two magnet units 13, the polarity of the permanent magnet 26 to one steel block 24 and the polarity of the permanent magnet 26 to the other steel block 24 are opposite. The first alnico magnet 25 can reverse the polarity due to the magnetic induction of the magnetic field to be generated by the first coil 23, and in the adjacent two magnet units 13, the polarity of the first alnico magnet 25 to one steel block 24 and the polarity of the first alnico magnet 25 to the other steel block 24 are opposite.

The proximity switch 36 fitted in the clamp plates 11 and 12 is turned on by making contact with the mold M in the case of fixing the mold M to the clamp plates 11 and 12, and the proximity switch 36 is turned off by separating the mold M from the proximity switch 36 in the case of deviating or floating the mold M fixed to the clamp plates 11 and 12, respectively, and a mold deviation detecting signal indicating that the deviation or float of the mold M is detected is sent to the interlock board 19.

Next, the operating condition displaying mechanism 30 will be explained.

As shown in FIGS. 2 to 4, the operating condition displaying mechanisms 30 are fitted at the front end of the clamp plates 11 and 12, respectively, and since these have the same structure, the operating condition displaying mechanism 30 fitted in the clamp plate 12 will be explained.

Figure 9:
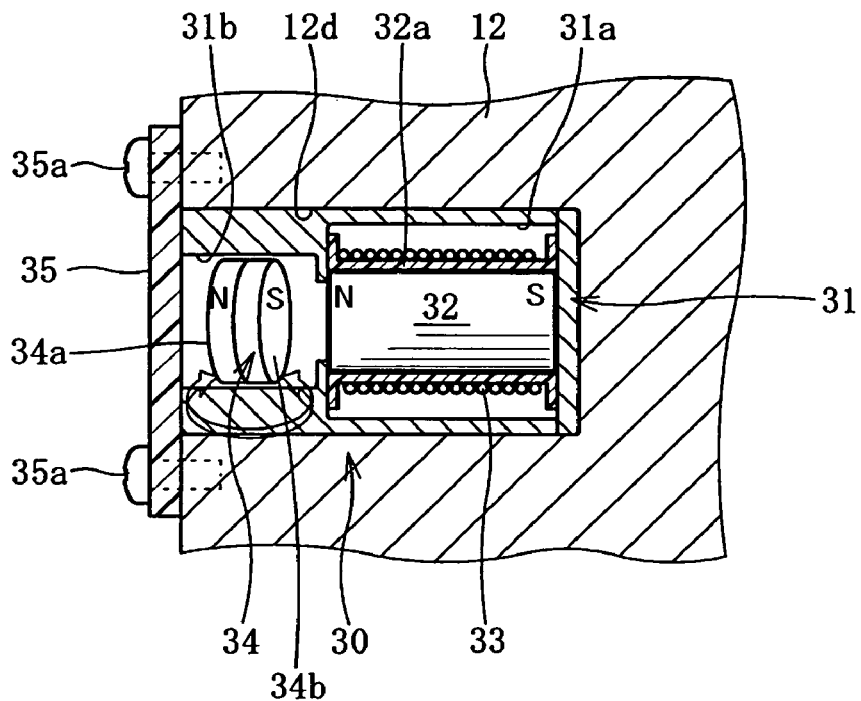
FIG. 9 is a cross sectional view of the operating condition displaying mechanism (adsorbing state) provided in the clamp plate.
Figure 10:
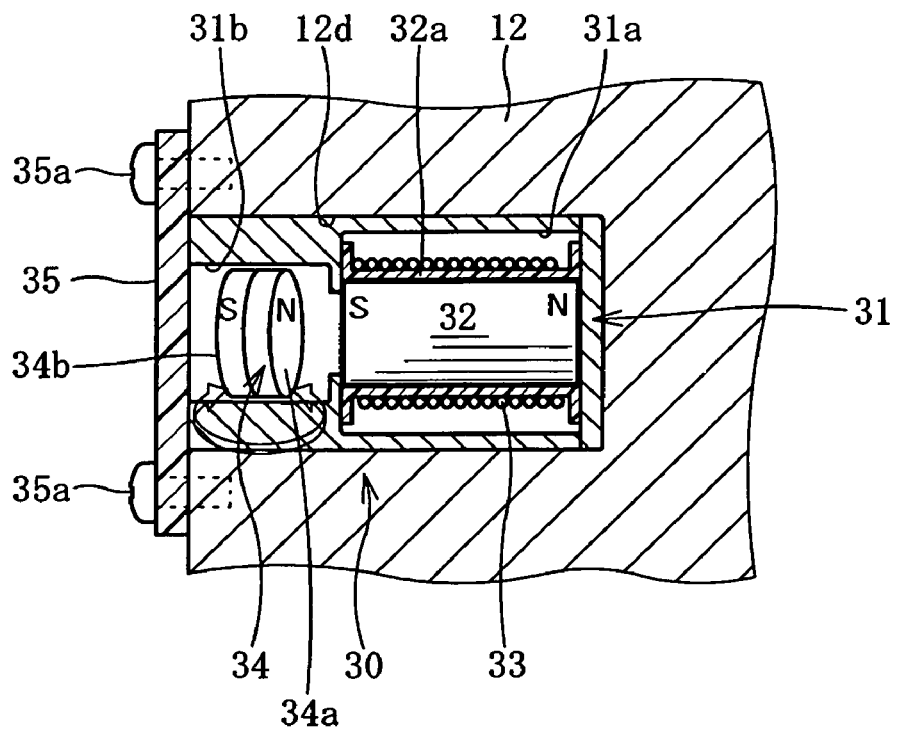
FIG. 10 is a cross sectional view of the operating condition displaying mechanism (non-adsorbing state) provided in the clamp plate.

As shown in FIG. 9 and FIG. 10, the operating condition displaying mechanism 30 has a steel case member 31 incorporated into the clamp plate 12, a cover member 35 made of a transparent acrylic resin covering the front surface side of this case member 31, a first accommodation hole 31a formed in the case member 31, a cylindrical second alnico magnet 32 accommodated in this first accommodation hole 31, a coil bobbin 32a made of synthetic resin fitted onto the second alnico magnet 32, a second coil 33 wound around this coil bobbin 32a, and a disk-like permanent magnet 34 accommodated to be reversible in the second accommodation hole 31b formed in the case member 31 at the entrance side compared to the first accommodation hole 31a.

A hole 12d is formed closer to the lower end of the front end of the clamp plate 12, and the case member 31 is incorporated into the hole 12d. The cylindrical first accommodation hole 31a is formed at the rear side of the case member 31, and in the case member 31, a cylindrical second accommodation hole 31b opening anteriorward at the front side (entrance side) in the case member 31 compared to the first accommodation hole 31a, and this second accommodation hole 31b communicates with the first accommodation hole 31a.

The second coil 33 accommodating the second alnico magnet 32 wound around the coil bobbin 32a is accommodated in the first accommodation hole 31a, and the permanent magnet 34 is accommodated within the second accommodation hole 31b so as to be reversible. An energizing circuit for energizing the second coil 33 only when a plurality of first coils 23 of the plurality of magnet units 13 are energized is provided in the clamp plate 12.

A red display surface 34a colored with red color (equivalent to the index) is formed at the one end of the permanent magnet 34, and a white display surface 34b colored with white color (equivalent to the index) is formed at the other end of the permanent magnet 34. When the red display surface 34a is orientated toward the front surface, it indicates that the plurality of magnet units 13 are in the adsorbing state, and when the white display surface 34b is orientated toward the front surface, it indicates that the plurality of magnet units 13 are in the non-adsorbing state.

The cover member 35 is fixed to the clamp plate 12 by four screws 35a in the state where the front surface side of the case member 31 is covered. In the operating condition displaying mechanism 30, either the red display surface 34a or the white display surface 34b of the permanent magnet 34 is displayed outward, and it is designed to identify whether the plurality of magnet units 13 are in the adsorbing state or non-adsorbing state by viewing the red display surface 34a or the white display surface 34b of the permanent magnet 34 displayed on the operating condition displaying mechanism 30.

As shown in FIG. 7, in the case that the mold M2 is fixed to the fixation surface 12a of the clamp plate 12, when the first alnico magnet 25 is switched as shown in FIG. 7, all magnet units 13 become in the adsorbing state. At this time, at the same time of switching the first alnico magnet 25, the operating condition displaying mechanism 30 is also switched as shown in FIG. 9, and the permanent magnet 34 is reversed, and the operating condition displaying mechanism 30 displays the red display surface 34a. Consequently, an operator can identify that the plurality of magnet units 13 on the clamp plate 12 are in the adsorbing state.

Figure 8:
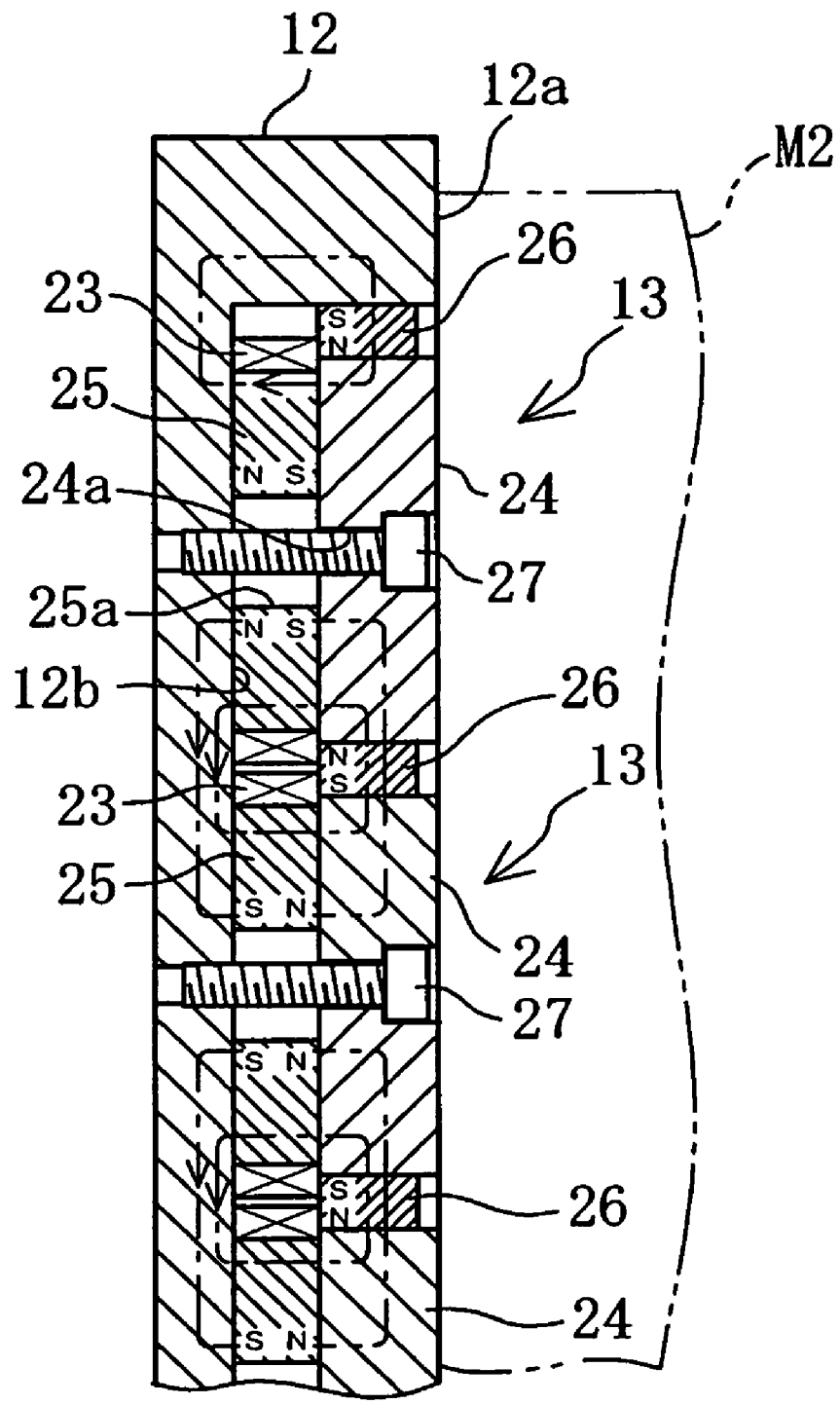
FIG. 8 is a cross sectional view of the clamp plate in the movable platen (non-absorbing state)

In the meantime, when fixation of the mold M2 is released from the fixation surface 12a of the clamp plate 12, the polarity of the first alnico magnet 25 is switched as shown in FIG. 8, and each magnet unit 13 becomes in the non-adsorbing state. At this time, at the same time of switching the first alnico magnet 25, the operating condition displaying mechanism 30 is also switched as shown in FIG. 10, and the permanent magnet 34 is reversed, and the operating condition displaying mechanism 30 displays the white display surface 34b. Consequently, an operator can identify that the plurality of magnet units 13 of the clamp plate 12 are in the non-adsorbing state.

Next, a control system is explained.

The molding machine control unit 37 shown in FIG. 11 has a computer including CPU, ROM and RAM and an I/O interface. The molding machine control unit 37 controls various mechanisms regarding the injection molding including the movable platen driving mechanism 4, the injection mechanism 6 and the ejection mechanism 7.

The molding machine control unit 37 receives a plurality of signals from a plurality of sensors fitted in the various mechanisms regarding the injection molding, and determines whether or not the conditions required for safely fixation of the mold M or releasing the fixation, and if it is determined that the required conditions are satisfied, the molding machine control unit 37 sends an operation permission signal indicating that the magnet units 13 of the clamp plates 11 and 12 are operable, to the operation control unit 15 via the interlock board 19. Further, the molding machine control unit 37, if any deviation or float of the mold M is detected by the proximity switch 36, as described later, receives an emergency stop signal to be sent from the interlock board 19 and urgently stops the various mechanism regarding the injection molding including the movable platen driving mechanism 4, the injection mechanism 6 and the ejection mechanism 7, respectively.

Figure 12:
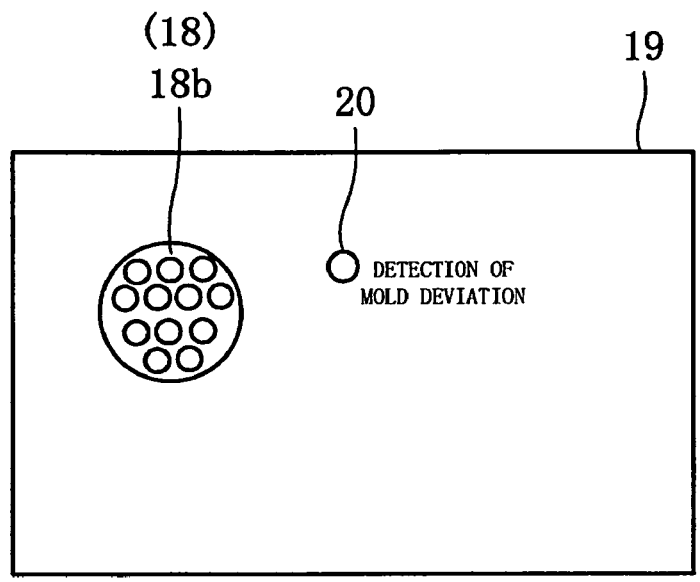
FIG. 12 is a front view of the interlock board.

As shown in FIG. 1, FIG. 11 and FIG. 12, the interlock board 19 has a computer including CPU, ROM and RAM, the I/O interface, a power source circuit for converting AC power supplied from the power source device 38 into the DC power and for adjusting the voltage, and a switching circuit for switching the connection status with the proximity switch 36. This interlock board 19 is connected to the molding machine control unit 37 and the power source device 38, and is connected to a plurality of first coils 23, a second coil 33 and the proximity switch 36 of the clamp plate 11 via the connector 21; concurrently, is connected to a plurality of first coils 23, the second coil 33 and the proximity switch 36 of the clamp plate 12 via the connector 22.

A female connector 18b (common connector) connectable with a male connector 18a of the operation control unit 15, and an warning lamp 20 for annunciating that the mold M is deviated or floated is fitted on the front surface of the interlock board 19. The deviation detection controller for illuminating the warning lamp 20 in the case that the interlock board 19 receives a mold deviation detection signal from the proximity switches 36 of the clamp plates 11 and 12 and for, concurrently, sending an emergency stop signal to the molding machine control unit 37 is provided on the interlock board 19, and this deviation detection controller is constituted with a computer of the interlock board 19.

DC power for driving the first and second coils is supplied to the operation control unit 15 from the power source circuit of the interlock board 19. The switching circuit of the interlock board 19 is switched so as to disconnect the connection with the proximity switches 36 in the state where the mold M is not fixed, and a mold deviation detection signal from the proximity switches 36 will never be sent to the microcomputer of the interlock board 19. Until the fixation of the mold M is released after the mold M is fixed, the switching circuit switches the mold deviation detection signal from the proximity switches 36 to be sendable to the computer of the interlock board 19.

Figure 13:
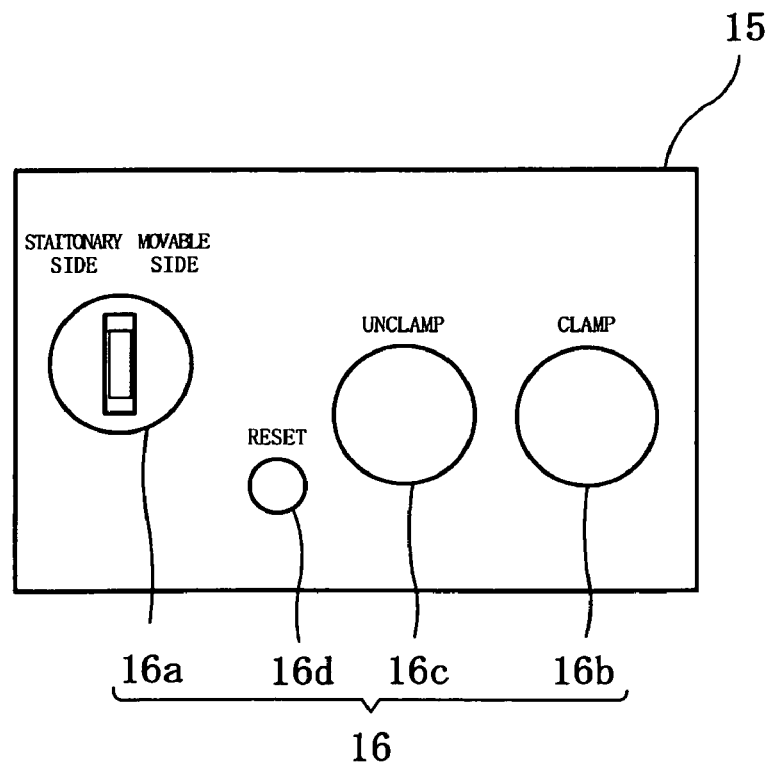
FIG. 13 is a plan view of the operation control unit.

As shown in FIG. 1, FIG. 11 and FIG. 13, the operation control unit 15 has an operating board 16 that can enter an instruction to the plurality of magnet units 13 of the clamp plates 11 and 12, the controller 17 for supplying electric power that allows the magnet units 13 of the clamp plates 11 and 12 to be in the adsorbing state or the non-adsorbing state based upon the instruction from the operating board 16, and the driving circuits 17a and 17b for supplying DC power to the first and second coils 23 and 33 of the clamp plates 11 and 12, and is configured to be connectable to the interlock board 19 of any one of the injection molding machines 1 via the male connector 18a to be connectable to the common female connector 18b of the plurality of the interlock boards 19.

A switch 16a for alternatively switching the operation subject between the clamp plate 11 of the stationary platen 2 and the clamp plate 12 of the platen 3; an operation button 16b for instructing to secure the mold M; an operation button 16c for instructing to release the fixation of the mold M; and a reset button 16d are provided on the operation board 16 on the upper surface of the operation control unit 15.

The controller 17 has the computer including CPU, ROM and RAM and the I/O interface, and driving circuits 17a and 17b are provided in the I/O interface of the controller 17. The controller 17 supplies power to the magnet units 13 of the clamp plates 11 and 12 based upon the instruction from the operating board 16 on condition that the operable signal is received from the interlock board 19, and switches from the adsorbing state to the non-adsorbing state or from the non-adsorbing state to the adsorbing state. In parallel to this switching, the controller 17 energies the second coil 33 of the clamp plates 11 and 12 and switches the display of the operating condition mechanism 30, and the red display surface 34a is displayed in the adsorbing state and the white display surface 34b is displayed in the non-adsorbing state.

Next, functions and advantages of this mold fixing system S will be explained.

First, when the mold M is secured to the platens 2 and 3, the mold M in the state where the molds M1 and M2 are connected is carried between the platen 2 and the platen 3 by a carrying means, such as a crane. At this time, after the operation control unit 15 is connected to the interlock board 19 via the connector 18, the plurality of magnet units 13 of the clamp plates 11 and 12 are in non-adsorbing state as shown in FIG. 8, and any magnetic force by the plurality of magnet units 13 does not act on the mold M.

When the magnet units 13 of the clamp plates 11 and 12 are switched to the non-adsorbing state, the second alnico magnet 32 of the operating condition displaying mechanism 30 is also switched and a state is switched to display the white display surface 34b.

Next, the molds M1 and M2 are positioned and come into contact with the fixation surfaces 11a and 12a of the clamp plates 11 and 12 of the platens 2 and 3, respectively, and the circular convex part of the mold M1 is fitted into the locating ring 11c of the stationary platen 11 for centering.

When the molds M1 and M2 are fixed to the fixation surfaces 11a and 12a of the clamp plates 11 and 12, respectively, after an operation subject is switched to the magnet units 13 of the clamp plate 11 or to the magnet units 13 of the clamp plate 12 by the switch 16a, the operation button 16b is operated.

When the mold M1 is fixed to the fixation surface 11a of the clamp plate 11, power is supplied from the controller 17 to each magnet unit 13 of the clamp plate 11 and the first coil 23 is energized in the predetermined direction for several seconds, respectively, and as shown in FIG. 7, the polarity of the first alnico magnet 25 is switched and a magnetic circuit using the mold M as a portion of the magnetic path is formed and the magnet units 13 become in the adsorbing state. At this time, the second alnico magnet 32 of the operating condition display 30 is also switched simultaneously, and switched to the state for displaying the red display surface 34a.

Next, when the mold M2 is fixed to the fixation surface 12a of the clamp plate 12, power is supplied to each magnet unit 13 of the clamp plate 12 with the procedures similar to the above described case regarding the platen 2. The operating condition display 30 placed in the clamp plate 12 is also switched similarly. Then, the connector 18 is disconnected and the operation control unit 15 is removed from the interlock board 19, and this operation control unit 15 is connected to another injection molding machine 1 for exchanging a mold next.

Next, when the fixation of the mold M1 is released from the fixation surface 11a of the clamp plate 11, power is supplied from the controller 17 to each magnet unit 13 of the clamp plate 11 and the first coil 23 is energized for several seconds to the opposite direction from that in the case of fixing the mold M1, and as shown in FIG. 8, the polarity of the first alnico magnet 25 is switched and each magnet unit 13 is switched to the non-adsorbing state. In parallel to this, the polarity of the second alnico magnet 32 of the operating condition displaying mechanism 30 is switched and the state is switched so as to display the white display surface 34b.

Next, even when releasing the fixation of the mold M2 from the fixation surface 12a of the clamp plate 12, the similar process is conducted. Then, the connector 18 is disconnected, and the operation control unit 15 is removed from the interlock board 19 and is connected to another injection molding machine 1 for next exchange of the mold.

Thus, the common female connector 18b of the connector 18 is provided in each of the plurality of molding injection machines 1 in the molding plant, and since the male connector 18a of a set of the operation control units 15 is configured to be connectable to the female connector 18b of any injection molding machine 1 and a set of the operation control units 15 is shared in the plurality of injection molding machines 1, it becomes unnecessary to place the operation control unit for mold attachment/detachment in each injection molding machine 1, and the plant cost for attaching/detaching molds to/from the injection molding machines 1 can be drastically saved.

Since the operating condition displaying mechanism 30 is provided and it is configured to display whether the plurality of magnet units 13 are in the adsorbing state or non-adsorbing state, whether or not the magnet units 13 are in the adsorbing state or non-adsorbing state can be easily identified even under the condition that the operation control units 15 are separated from the injection molding machine 1.

In addition, when a deviation of a mold is detected by the proximity switch 36, because the injection molding machine 1 becomes in the emergency stopped state, the safety can be secured.

Herein, examples for partially modifying the embodiment will be explained.

[1] Instead of providing the proximity switches 36 as the deviation detection means, a galvanometer is provided in some of the magnet units 13 among the plurality of magnet units 13 on the clamp plates 11 and 12, and it can be configured to detect a deviation or float of the molds from induced current generated in the first coil 23 of the magnet units 13.

[2] The mold fixing system S is also applicable to a mold fixing system of a blow molding machine.

[3] Instead of providing the operating condition display device 30 at the front ends of the clamp plates 11 and 12, respectively, the operating condition display device 30 can be fitted on the fixation surfaces 11a and 12a of the clamp plates 11 and 12, respectively.

[4] The interlock board 19 can be incorporated into a set of portable operation control unit 15, and this operation control unit 15 can be configured to be connectable to the connectors 21 and 22 of the clamp plates 11 and 12, the molding machine control unit 37 and the power source device 38 via the connector 18.

[5] Other than these modifications, it is needless to say, the present invention can be implemented in the mode where modification is added to the embodiment without departing from the scope of the invention.

Embodiment 2

Next, the mold fixing system S of Embodiment 2 will be explained. Provided that the same configurations as in the embodiment is marked with the same numerals, respectively, and only any different configurations are explained.

Figure 14:
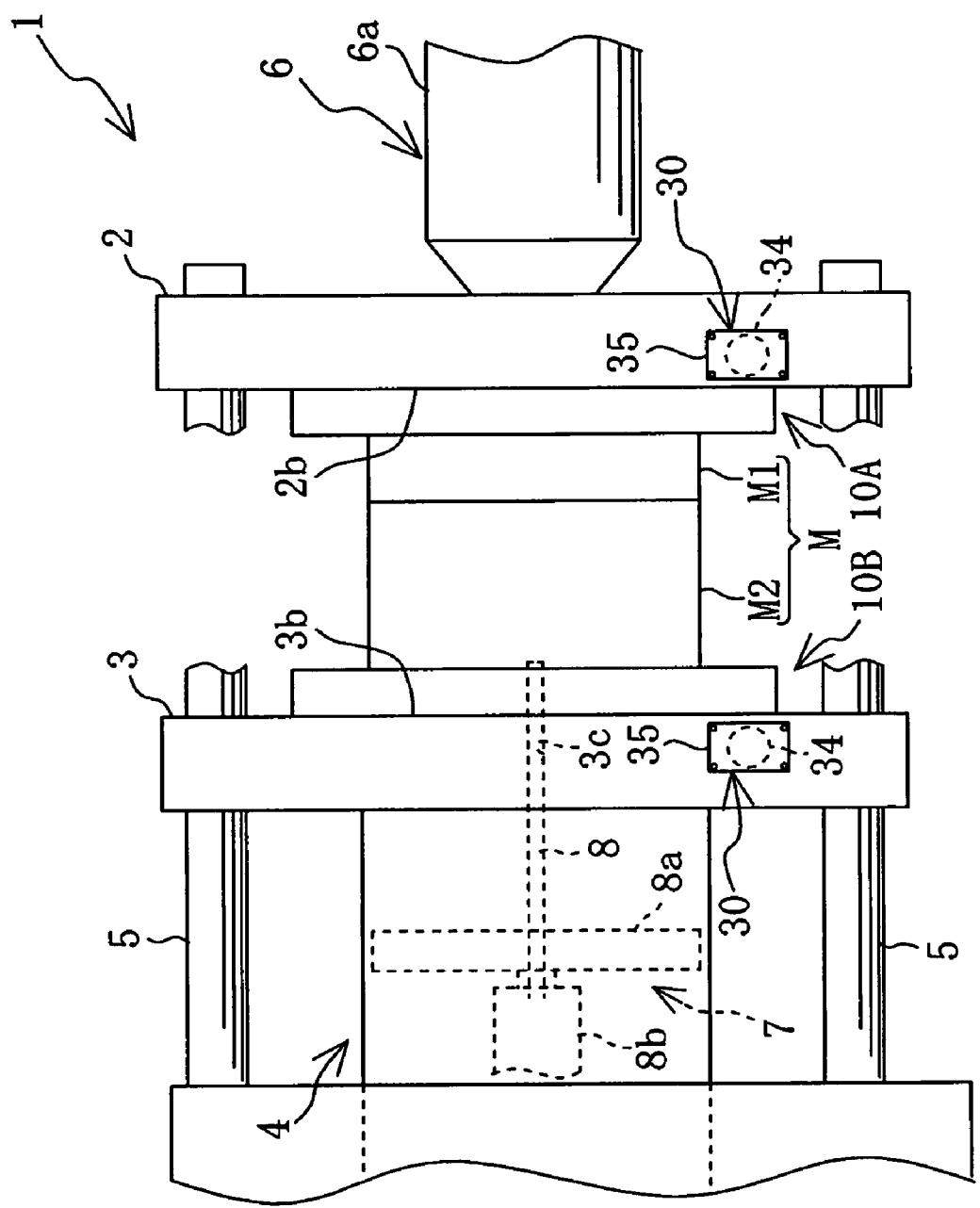
FIG. 14 is a front view of primary portion of the injection molding machine of Embodiment 2 and a mold.
Figure 15:
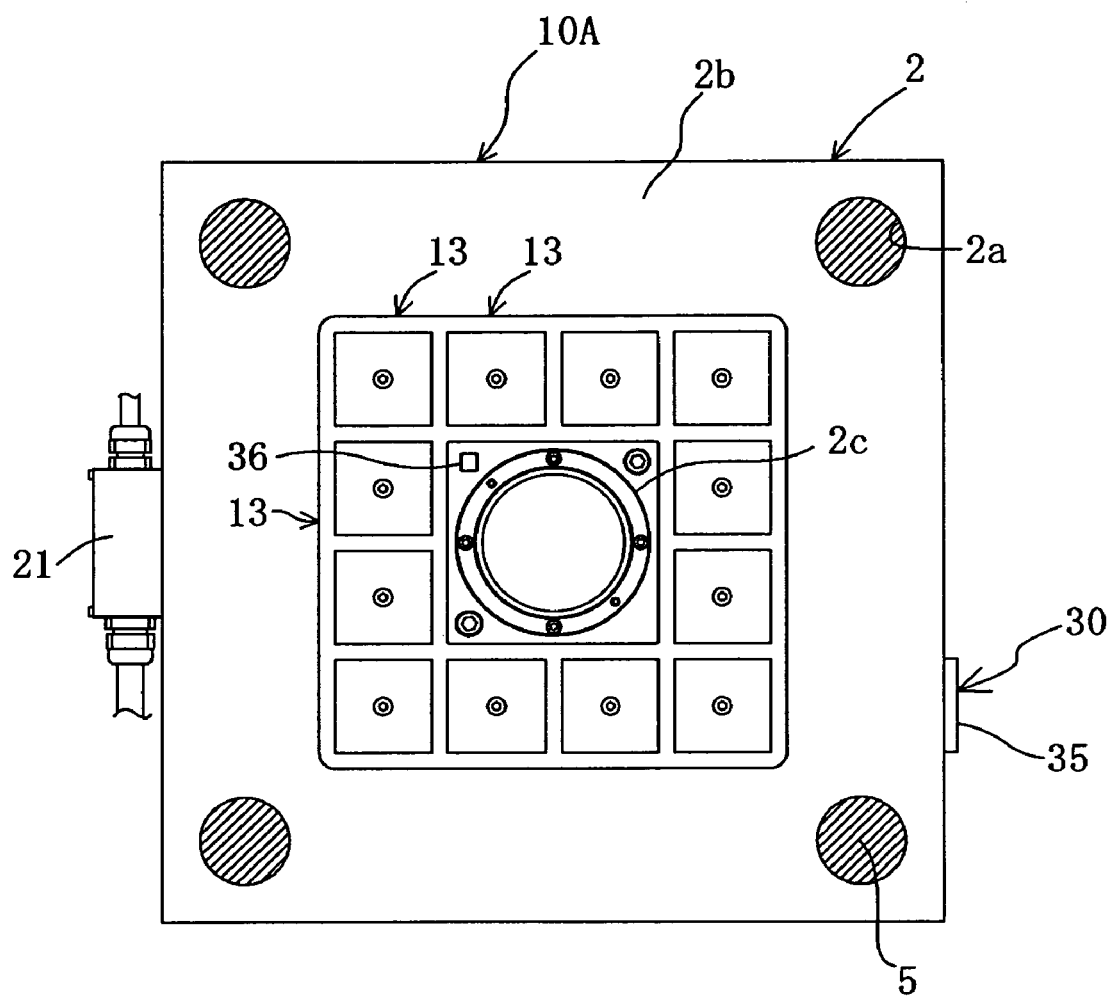
FIG. 15 is a side view of the stationary platen of Embodiment 2.
Figure 16:
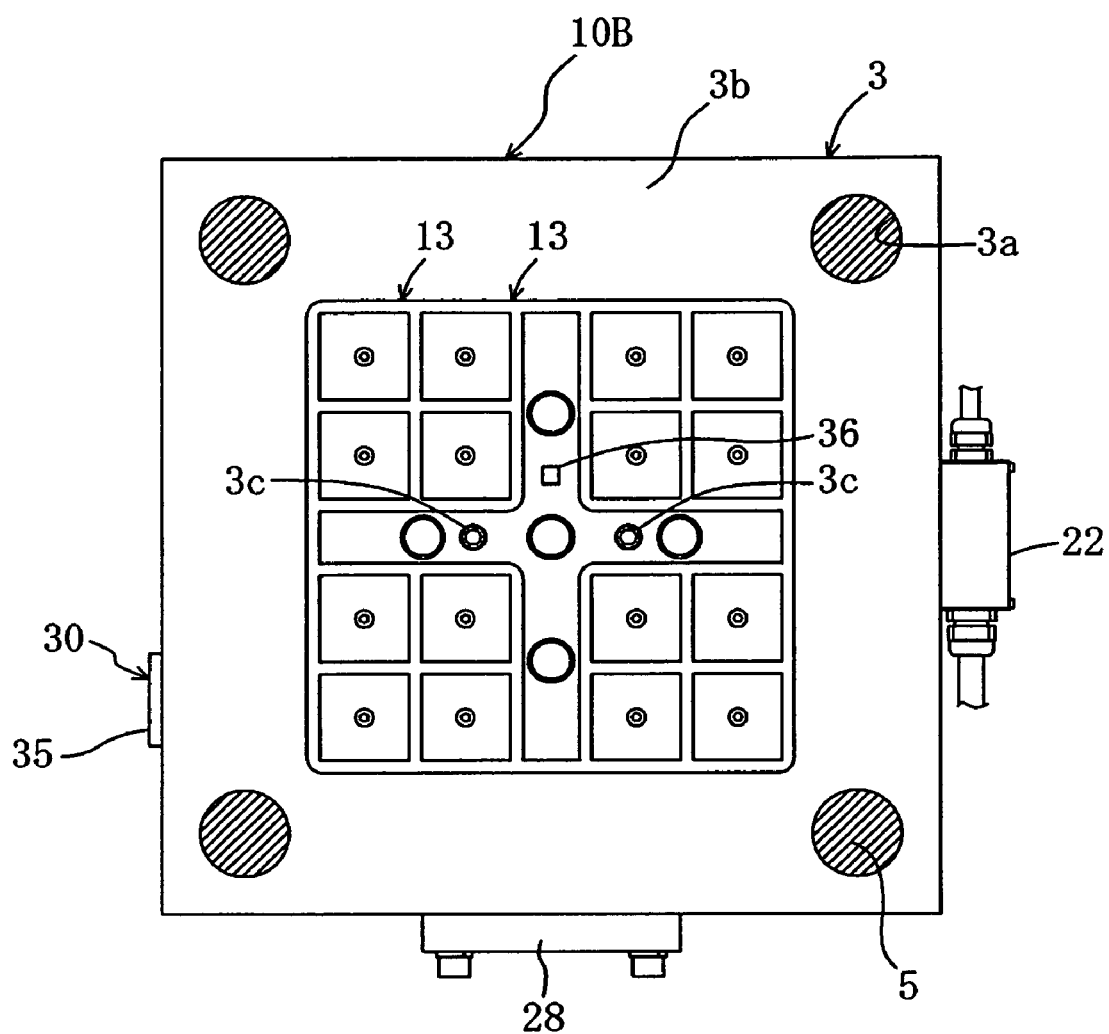
FIG. 16 is a side view of the movable platen of Embodiment 2.

As shown in FIG. 14 to FIG. 16, in this mold fixing system S, instead of providing the clamp plates 11 and 12 where a plurality of magnet units 13 are incorporated, the plurality of magnet units 13 are arranged in the stationary platen 2 and the movable platen 3.

The plurality of magnet units 13 to generate magnetic force for fixing the mold M1 to a fixation surface 2b are provided on the platen 2. The connector 21 is mounted to the rear end of the platen 2, and the locating ring 2c for positioning the mold M1 to the fixation surface 2b is mounted in the center portion. The proximity switch 36 as the deviation detection means is placed in the center portion of the fixation surface 2b of the platen 2, and the operating condition displaying mechanism 30 where an index indicating that the plurality of magnet units 13 placed in the platen 2 are in the adsorbing state or non-adsorbing state is displayable is fitted at the front end of the platen 2.

The plurality of magnet units 13 to generate magnetic force for fixing the mold M2 to a fixation surface 3b are provided in the platen 3. A pair of connectors 22 are mounted at the rear end of the platen 3, and the safety block 28 for preventing the mold M2 from falling is mounted at the lower end, and a pair of ejector pin holes 3c are placed in the center. The proximity switch 36 as the deviation detection means is placed in the center portion of the fixation surface 3b of the platen 3, and the operating condition displaying mechanism 30 where an index indicating whether the plurality of magnet units 13 placed in the platen 3 are in the adsorbing state or non-adsorbing state is displayable is fitted at the front end of the platen panel 3.

Thus, since the clamp plates are omitted and the plurality of magnet units 13 are incorporated into the platens 2 and 3, respectively, the distance from the end of the injection nozzle of the injection cylinder 6a of the injection mechanism 6 to the molding cavity of the mold M can be reduced. Other than those, the advantages similar to those in Embodiment 1 can be obtained. In addition, it is needless to say, a person with an ordinary skill in the art pertaining to the present invention can implement in the mode where modification is added to the embodiment without departing from the scope of the invention.

INDUSTRIAL APPLICABILITY

The present invention is applicable to a mold fixing system for a plurality of injection molding machines having a plurality of magnetic force generating mechanisms for generating magnetic force for mold fixation, respectively, and the plant cost at a molding plant having a plurality of the injection molding machines can be reduced.

What is claimed is:

1. A mold fixing system for a plurality of injection molding machines having a pair of platens, respectively, comprising:
    a plurality of magnetic force generating mechanisms which are mounted on the plurality of injection molding machines, respectively, for generating magnetic force for fixing a mold to a platen or a mold mounting plate fixed on the platen;
    a plurality of common connectors having the same structure which are mounted on the plurality of injection molding machines, respectively, each of which is electrically connected to the magnetic force generating mechanism, a control unit and a power source device of the injection molding machine; and
    a set of operation control units to be alternatively electrically connectable to any one of the plurality of injection molding machines, and which is electrically connectable to the magnetic force generating mechanism, the control unit and the power source device in said any one of the injection molding machines.

2. The mold fixing system according to claim 1, further comprising: a plurality of interlock boards, which are mounted on the plurality of injection molding machines, respectively, each of which is electrically connected to the magnetic force generating mechanism, the control unit, the power source device, and the common connector, respectively.

3. The mold fixing system according to claim 2, wherein the operation control unit comprises:
    an operating part that can enter an instruction to the magnetic force generating mechanism, and
    a controller that supplies power to allow the magnetic force generating mechanism to be in a condition based upon the instruction from the operating part.

4. The mold fixing system according to claim 3, wherein the operation control unit supplies power to the magnetic force generating mechanism on condition that a signal is received from the interlock board indicating that the magnetic force generating mechanism is operable.

5. The mold fixing system according to claim 1 or 2, wherein the magnetic force generating mechanism is configured to be switchable between an adsorbing state for adsorbing the mold and a non-adsorbing state for not adsorbing the mold, and an operating condition displaying mechanism which is capable of displaying an index indicating whether the magnetic force generating mechanism incorporated into the platen or the mold mounting plate is in the adsorbing state or the non-adsorbing state is provided on the platen or the mold mounting plate.

6. The mold fixing system according to claim 2, further comprising:

a deviation detecting means for detecting a deviation or float of the mold fixed on the platen or the mold mounting plate, and a deviation detection controller for outputting an emergency stop signal to the control unit of the injection molding machine when the deviation or float of the mold is detected by the deviation detecting means, which is mounted on the interlock board.

7. The mold fixing system according to claim 6, wherein the deviation detecting means is constituted with a proximity switch.

8. The mold fixing system according to claim 6, wherein the deviation detecting means is configured to detect the deviation or float of the mold from an induced current that is generated in a coil of the magnetic force generating mechanism.

9. The mold fixing system according to claim 1, further comprising:

a deviation detecting means for detecting a deviation or float of the mold fixed on the platen or the mold mounting plate, and a deviation detection controller for outputting an emergency stop signal to the control unit of the injection molding machine when the deviation or float of the mold is detected by the deviation detecting means, which is mounted on an interlock board.

* * * * *